July 10, 1956   J. R. GRETZINGER ET AL   2,754,002
FILTERS

Original Filed Nov. 4, 1948   2 Sheets-Sheet 1

Inventors
John R. Gretzinger,
Joseph A. Chea &
Miles G. Hanson

By
Willits, Helwig & Baillio
Attorneys

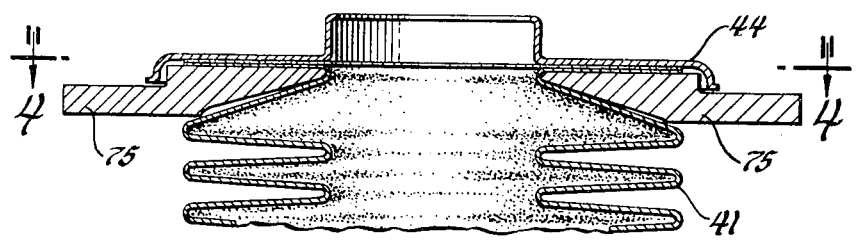
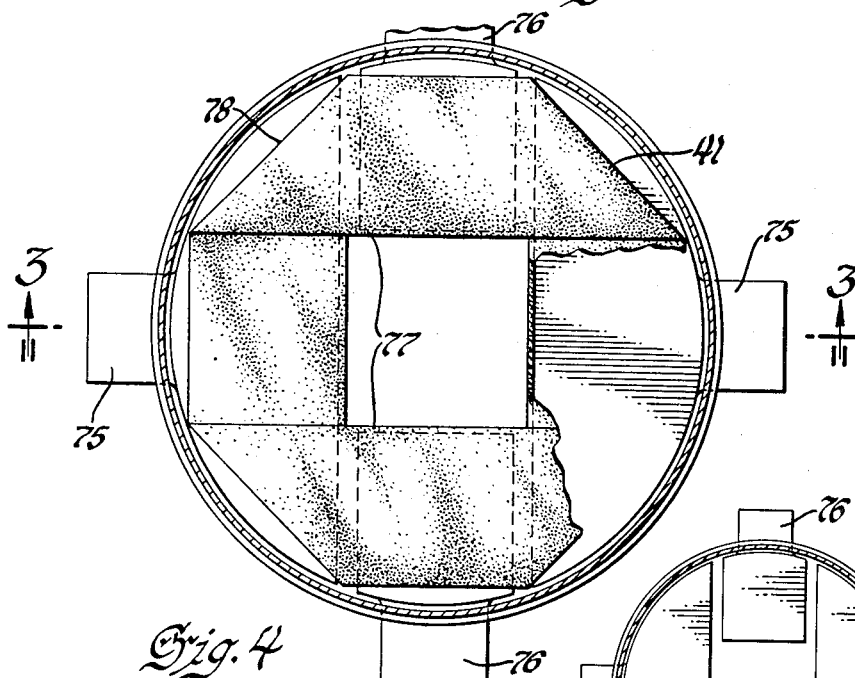
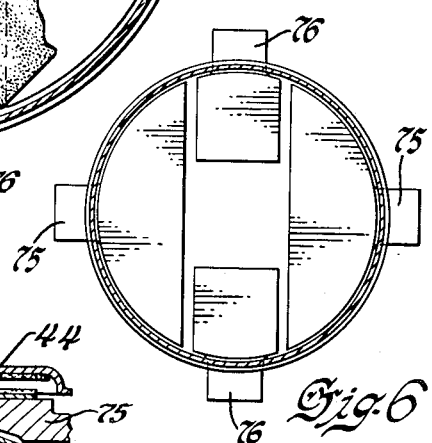
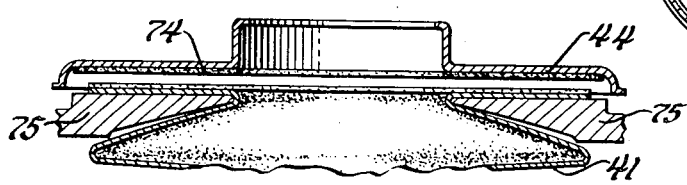

United States Patent Office 2,754,002
Patented July 10, 1956

2,754,002
FILTERS

John R. Gretzinger, Kansas City, Kans., and Joseph A. Chea and Miles G. Hanson, Flint, Mich., assignors to General Motors Corporation, Detroit, Mich., a corporation of Delaware Original application November 4, 1948, Serial No. 58,285, now Patent No. 2,685,371, dated August 3, 1954. Divided and this application February 15, 1952, Serial No. 271,818

1 Claim. (Cl. 210—169)

This invention relates to filters and more particularly to bellows-folded, resin-impregnated filters.

The object of this invention is to provide a filter with a unit wherein the bellows-folded, resin-impregnated filter surface is bonded to end plates.

Another object of the invention is to provide a bellows-folded, resin-impregnated filter wherein the end pleats are resin-bonded to the end plates, and the adjacent end pleats are bonded to each other to prevent leakage between the folds.

The invention provides an improved end seal for an alternately pleated type bellows filter. When this type of pleated bellows filter is sealed to the filter end plates, there is often leakage at some fold lines. In order to prevent this leakage the end surface of the alternately pleated bellows is sealed by means of a resin adhesive to the end plate and the inner surfaces of the last two opposed end pleats are also sealed adjacent the fold lines. This construction provides a strong durable and leak proof seal for the end of the bellows.

Another object of this invention is to provide a filter with a resin-impregnated paper folded into a bellows and resin-bonded to itself and to an end plate.

This application is a division of the copending application Serial No. 58,285 of John R. Gretzinger, Joseph A. Chea and Miles G. Hanson, filed November 4, 1948 and which was granted August 3, 1954, in the name of John R. Gretzinger as United States Patent 2,685,371.

Other objects and advantages will be apparent from the following specification and drawings.

Figure 3 is a sectional view of the bellows, end plate and pressure fingers on the line 3—3 of Figure 4.

Figure 4 is a plan view on the line 4—4 of Figure 3.

Figure 5 is a cross section of the bellows, end plate and pressure fingers before assembly.

Fig. 6 is a view similar to that of Fig. 4 but drawn to a reduced scale and omitting the filter element.

Figure 1:
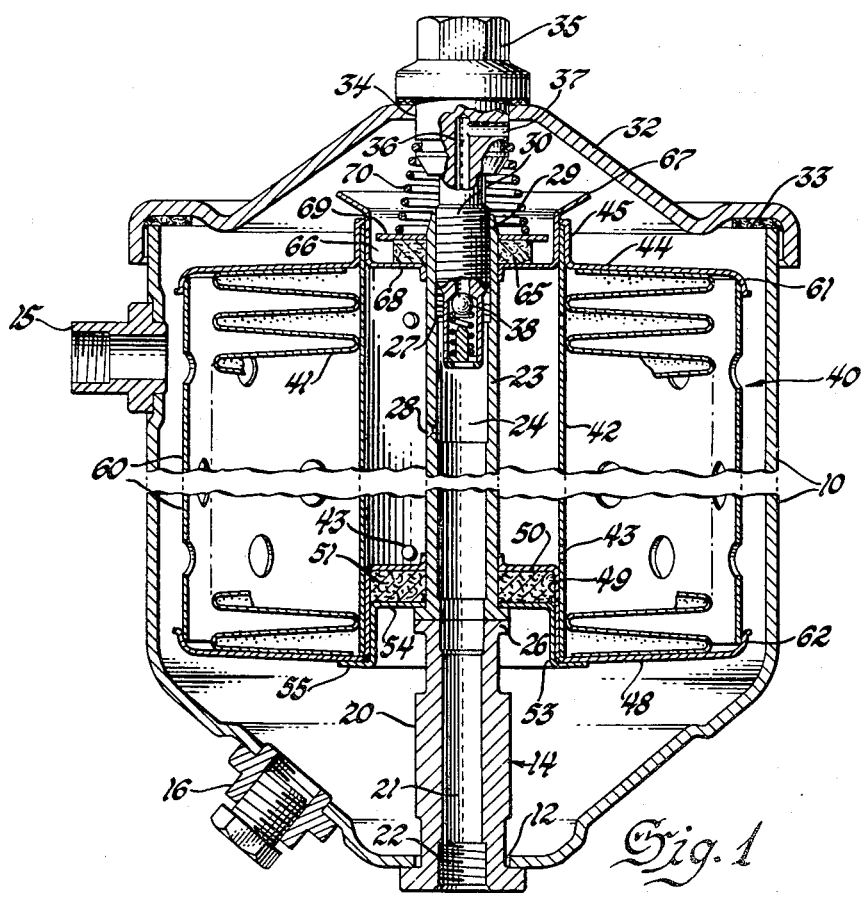
Figure 1 is a cross section of the filter.
Figure 2:
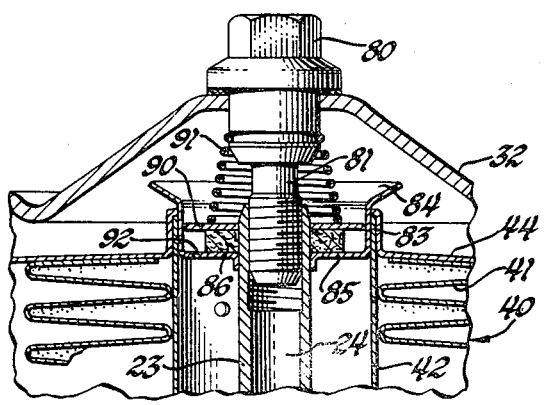
Figure 2 is a fragmentary view showing a modification.

This filter, which is especially adapted for use in the lubrication system of internal combustion engines, has an outer casing 10 of a generally cylindrical shape with a tapered or conical bottom. An aperture 12, located centrally in the conical bottom of the casing 10 receives the post 14 which is secured and sealed to the casing. The inlet bushing 15 is secured in an aperture preferably near the top of the casing, while a plugged drain bushing 16 is secured in a suitable manner near the bottom of the base of the casing.

The central post 14 is hollow throughout its length and is made of a lower part 20 having a central passage 21 which has threads 22 at the end to provide for a return connection for the clean oil and an upper part 23 having a similar central passage 24. A flange 26 is provided at the meeting edges of the lower part 20 and the upper part 23 to provide a better welded or brazed joint between the parts and to provide a support for the filter unit. The upper part 23 of the post has a metering orifice 28 which allows only a small quantity of oil to flow into the passage 24 in the central post 14. The upper end of the post part 23 has internal threads 27 for the reception of a bolt 30 and an external bevel 29 so that gaskets may be positioned over the post.

A dome-shaped cover 32 suitably seated on the casing 10 by a gasket 33 has a central aperture 34. The shank of bolt 30 passes through the aperture 34 in the cover and is threaded into the internal threads 27 at the top of upper post part 23 until the head 35 engages the cover and holds it in position. The shank of the bolt has an axial passage 36 and an interconnected radial passage 37. The lower end of the passage is provided with a one-way ball valve 38 having an outlet to the passage 24 in the post.

The filter unit 40 employs a polygonal bellows 41 folded from a resin-impregnated filter paper as shown in the copending application Serial Number 58,283 of John R. Gretzinger, filed November 4, 1948. The bellows 41 is mounted on a central tube 42 perforated at 43 to allow the filtered oil to pass through the tube. The top end of the bellows 41 is glued or resin-bonded to a top plate 44. A central cylindrical flange 45 on the top plate is secured as by welding to the tube 42. The lower end of the bellows 41 is bonded to a bottom plate 48 which has a cylindrical central flange 49 secured preferably by spot welding to the tube 42. At the inner end of flange 49 an annular portion 50 of the flange provides a support for gasket 51. A gasket retaining and abutment piece has a cylindrical body 53 fitting within the cylindrical flange 49, a gasket-retaining annular flange 54 and an outer securing flange 55.

A protecting cover for the paper bellows is provided by the apertured cylindrical casing 60 made of suitable sheet material, such as resin-impregnated paper or metal. The casing 60 is held in position by the inturned flange 61 on the top plate 44 and the inturned flange 62 on the bottom plate 48.

At the top end of the filter unit 40 a seal support and handle member has a cylindrical part 66 positioned and secured in the top end of the tube 42. An outwardly flaring flange 67 on the cylindrical part 66 provides a handle to remove the filter unit 40 from the casing 10. At the inner end of the cylindrical part 66 an annular flange 68 extends inwardly to the post 23 and supports the gasket 65. A washer 69 is positioned on top of the gasket to protect the gasket and provide a seat for compression spring 70. The other end of spring 70 seats on the shank of bolt 30. The opposite ends of the polygonal bellows 41 are bonded to the metal end plates 44 and 48 in the same manner. Thus, though Figures 3, 4, and 5 show the specific bonded joint between the top plate 44 and the bellows, they are illustrative of the bonded joint at both ends of the filter. The top plate 44 is first coated with an annular band of resin adhesive material 74 (as in Figure 5). The wide clamping portions of fingers 75 are of segmental form and these are positioned on opposite sides of the bellows in such a way as to confine end pleats of the latter against the plate 44 as illustrated in Figs. 3 and 4. Each finger 75 cooperates with the plate 44 to clamp an intermediate single layer of paper covering a rectangular area located between the edges 77 and also two triangular shaped areas of double thickness extending outwardly from those edges. The narrow clamping fingers 76 extend between the pleats of the bellows from opposite sides of the latter to clamp two rectangular areas of double thickness constituting one pleat at each side of the bellows against the plate 44.

The segmental portions of fingers 75 are clamped with sufficient pressure to compress the double layer of paper, particularly in the triangular end regions, to the same thickness as a single layer. The contours of the clamping fingers 75 and 76 are clearly seen in Fig. 6. Sufficient clamping area is provided to ensure proper bonding, as stated above. Thus pressure is applied to both the square central region, in respect to each finger 75, with one thickness of paper and the triangular end portions having a double thickness.

The paper has a resin content sufficient to increase the wet strength so that the filter unit will withstand the filter operating pressure. Under normal conditions filter papers with a thermosetting resin content of between 25% and 60% are satisfactory.

When the heat and pressure are applied to seal the end of the bellows 41 to the plate 44 by means of the resin 74, the resin-impregnated paper layers in the bellows will seal together in the corner areas defined by the edges 77 and the folds 78. The two overlapping layers of the filter paper must be sealed together to prevent leakage between the layers of paper at the fold at each end of the edges 77. Though the double layers may be sealed all along both edges 77 as they traverse the width of the other pleats, it is crucial and necessary that they be sealed at the apex of each of the four triangles defined by the ends of the edges 77 and outer diagonal corner folds 78 of the pleats. These layers are sealed together at these corner areas by employing a high bonding pressure to compress the double layer to a single thickness with high resin content paper thereby gaining a sealing of depth. With lower bonding pressures or resin content it may be necessary to locally increase the bonding pressure or to add resin at this point or both.

When this filter is employed in the lubrication system of internal combustion engines the oil line from the pump is connected to the bushing 15 of the casing 10. The oil fills the casing and surrounds the filter unit 40. The oil passes through the apertured guard casing 60, and then through the filtering bellows 41 where it is filtered. The tube 42 is apertured at 43 to allow the oil to pass freely through the tube to the metering orifice 28 in the side wall of hollow post 14. This orifice 28 is made small enough to limit the fluid flow to the normal amount of fluid that is filtered. Thus if the filter paper bellows 41 breaks or the the filter element is left out of the filter, the oil flow through the system will not be unduly increased, and thus the pressure at the pump outlet dangerously reduced. The oil then flows through the central passages 24 and 21 of post 14 to the outlet. If the bellows 41 is clogged the oil will flow through by-pass passages 37 and 36 and valve 38 directly to the outlet passages 24 and 21 in post 14.

The above described embodiments are illustrative of the invention. Numerous modifications may be made by those skilled in the art within the scope of the appended claim.

We claim:

A filter comprising a polygonal filter unit having a bellows with a plurality of peripheral pleats, said pleats having triangular portions which overlap, a pair of end plates fixed to said unit, the end peripheral pleats of said bellows having single layer portions and alternate double layer portions bonded to one of said end plates, and the layers of each of said double layer portions being bonded together to provide a bond of depth throughout the periphery of said end pleat to seal the end of said filter unit.

References Cited in the file of this patent

UNITED STATES PATENTS

| | | |
|---|---|---|
| 1,970,666 | Martinet | Aug. 21, 1934 |
| 2,556,521 | Chase | June 12, 1951 |
| 2,642,187 | Bell | June 16, 1953 |